Nov. 11, 1941.  B. ALTMAN ET AL  2,262,661
STEAM GENERATING ELECTRIC SADIRON
Filed Jan. 16, 1939   2 Sheets-Sheet 2
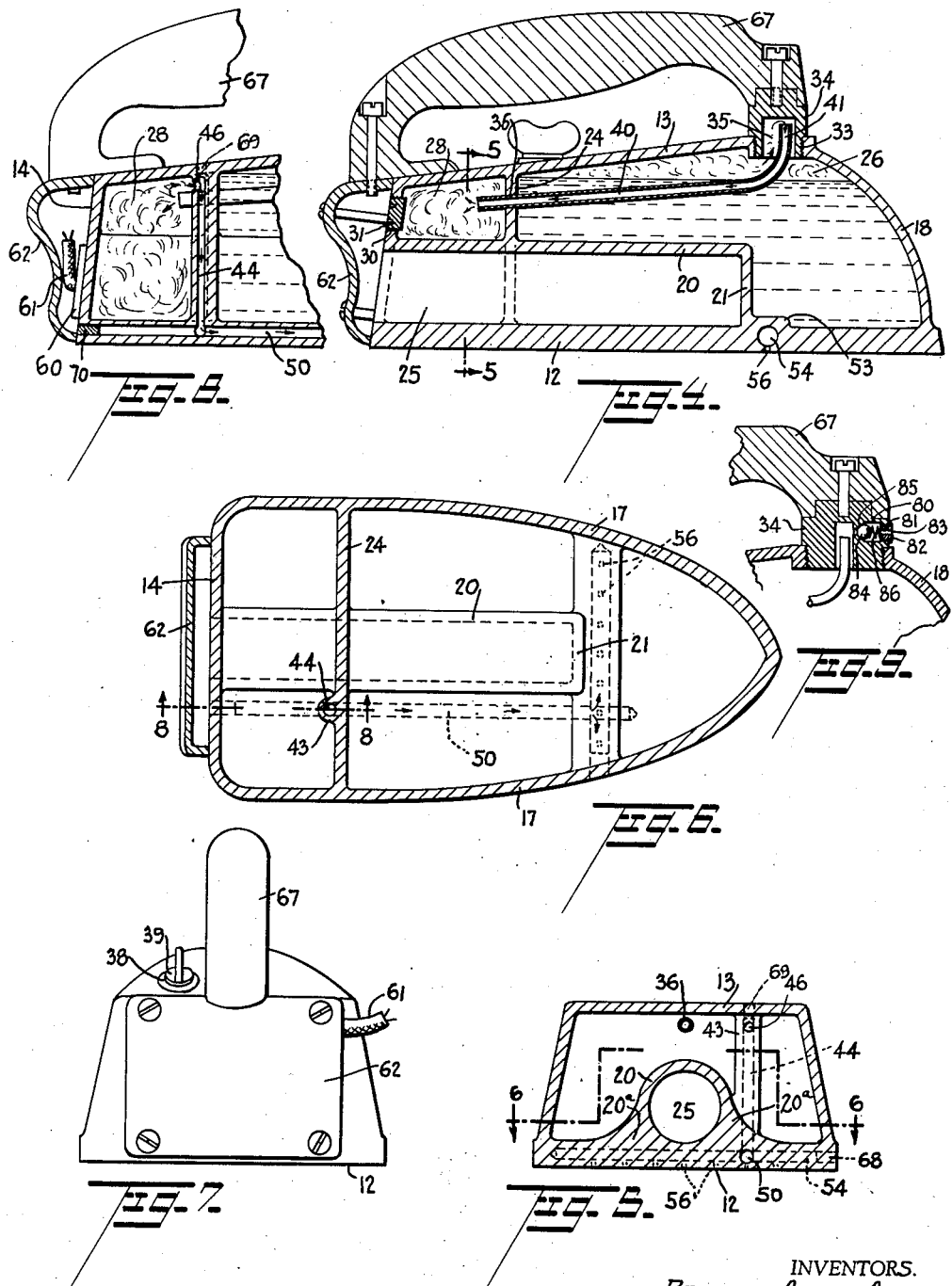
INVENTORS.
BERNARD ALTMAN AND
PAUL STILLER.
BY Carl Miller
ATTORNEY.

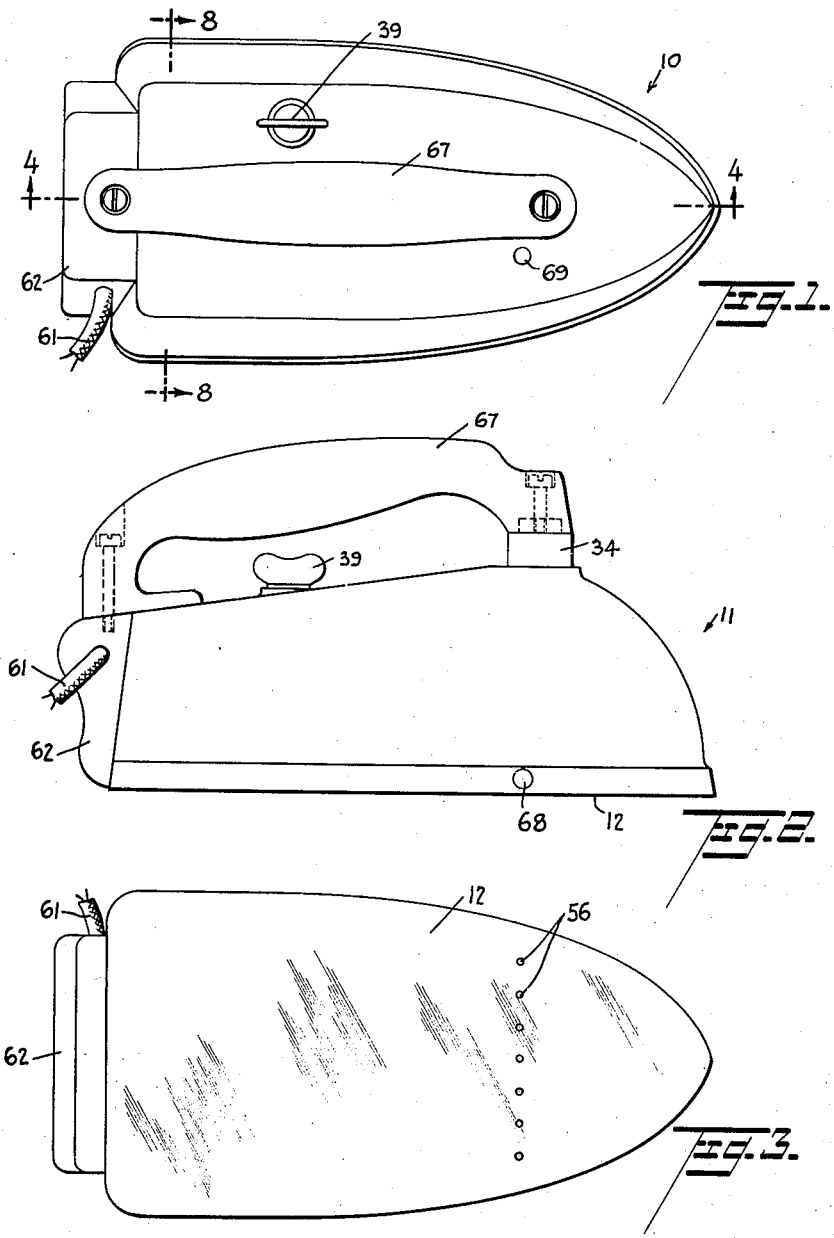

Patented Nov. 11, 1941

2,262,661

UNITED STATES PATENT OFFICE 2,262,661

STEAM GENERATING ELECTRIC SADIRON

Bernard Altman, New York, and Paul Stiller, Bronx, N. Y.

Application January 16, 1939, Serial No. 251,209

6 Claims. (Cl. 38—77)

This invention relates to steam generating electric sadirons.

An object of this invention is to provide a sadiron of the character described, provided with a chamber adapted to contain a quantity of water or other liquid, and electric means to keep the water hot for generating steam adapted to pass through small openings to the underside of the sadiron, whereby steam may be applied to articles during the pressing operation.

A further object of this invention is to provide in a sadiron of the character described, safety valve means to permit escape of steam should the steam arise above a predetermined pressure.

A still further object of this invention is to provide a strong, rugged and durable sadiron of the character described, which shall be easy to assemble, relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a top plan view of a sadiron embodying the invention;

Fig. 2 is a side elevational view thereof;

Fig. 3 is a bottom plan view thereof;

Fig. 4 is a cross-sectional view taken on line 4—4 of Fig. 1;

Fig. 5 is a cross-sectional view taken on line 5—5 of Fig. 4;

Fig. 6 is a cross-sectional view taken on line 6—6 of Fig. 5;

Fig. 7 is a rear end elevational view of the improved sadiron;

Fig. 8 is a cross-sectional view taken on line 8—8 of Fig. 6; and

Fig. 9 is an elevational, cross-sectional view through the forward end of the handle, and illustrating the safety valve for the steam generating chamber.

Referring now in detail to the drawings, 10 designates a sadiron embodying the invention. The same comprises a casing 11, having a bottom wall 12, a top wall 13, a rear wall 14, and forwardly and upwardly converging side walls 17, converging to a forwardly and downwardly curved front nose 18.

Integrally formed with the bottom wall 12, and disposed within the casing is a longitudinal, centrally located tubular portion 20, open at the rear and formed with a front end wall 21, located rearwardly of the front end of the casing.

The casing 11 is furthermore formed with an integral, transverse, vertical partition or wall 24, disposed between the end wall 21 of the tube 20 and the rear wall 14 of the casing. The casing is thus divided into three chambers, to wit, the tubular chamber 25 formed by tubular portion 20, a chamber 26, forwardly of the partition or wall 24, and a chamber 28, rearwardly of the partition 24.

The rear wall 14 is formed with a screw threaded opening 30, communicating with the chamber 28, and closed by a screw plug 31.

The top wall 13 of the casing may be inclined forwardly and upwardly, and the front end thereof is formed with a screw threaded opening 33, communicating with the steam generating chamber 26, and closed by a plug 34 formed on the underside thereof with a socket 35, for the purpose hereinafter appearing.

The partition or wall 24 is formed with a through opening 36, disposed above the tubular portion 20, for the purpose hereinafter appearing.

The top wall 13 of the casing may also be formed with an opening 38 located on one side of the longitudinal axis thereof, communicating with the water or steam generating chamber, and closed by a screw plug 39. It should be noted that the location of said opening 38 is at such elevation so as to permit a predetermined amount of water only to pass into chamber 26 and the excess to overflow. It therefore acts as a measuring device for the proper amount of water required for the efficient operation of the device. It will now be understood that water may be admitted to the chamber 26 by opening the plug 39.

Fixed to the wall 24 and extending through the opening 36 therein, is a tubular member 40, the right end whereof projects into the chamber 28. Said tube 40 extends forwardly through the chamber 26, and has an upwardly curved portion 41 at its forward end projecting into the socket 35 of the plug 34. The partition or wall 24 is formed on one side of the tubular portion 20 with a vertical rib 43, projecting into the chamber 28. Said rib is formed with a vertical bore 44, communicating with the chamber 28, through an opening 46 at the upper end of the rib. It will be noted that fillets 20a along tube 20 convey heat and distribute it over the sole plates so the device will press uniformly. Expansion chamber 28 also converts into steam any water that may be received from chamber 26.

The bottom wall 12 of the sadiron is formed with a longitudinal bore 50, which bore 50 superheats the steam passing from chamber 28 to bore 54, and communicating with the bore 44 and disposed at right angles to the wall 24. The bottom wall 12 is formed on its upper surface, just forwardly of the end wall 21, with a transverse thickened rib 53. Said rib 53 is formed with a transverse bore 54 communicating with the bore 50. Said bottom wall 12 is furthermore formed with a plurality of spaced small openings 56, extending to the bottom surface of the sadiron and communicating with the bore 54.

Inserted within the tubular chamber 25 is an electric heating element 60 of any suitable construction, from which there extends an electric cable 61 carrying a plug (not shown) for connection to any suitable outlet socket.

Attached to the rear wall 14 of the casing is a metallic cover 62, provided with a suitable opening through which the cable 61 passes. The sadiron is provided with a handle 67 of any suitable construction. The handle may be attached at its forward end to the plug 34, and at its rear end to the casing 62 in any suitable manner.

The bore 54 may be made by drilling through a side of the casing, and one end of the bore may be plugged by a plug 68. The bore 44 may be made by drilling downwardly from the top, and the upper end of the bore may be plugged by a plug 69. The bore 50 may be made by drilling from the rear, and the rear end of the bore may be closed by a plug 70.

The opening 30 is located on the same side of the tubular portion 20 as the openings 36 and 46, so that an instrument may be inserted through the opening 30 for drilling said openings 36 and 46.

The operation of the device will now be described:

Water is fed into the chamber 26 through the opening 38. The electric cord or cable 61 may then be attached to an electric outlet and the electric heating unit 60 heats the water in the chamber 26, generating steam. The steam passes upwardly into socket 35 and through tube 40 in the direction of the arrows entering the steam chamber 28 where it is further vaporized. The steam then passes through the chamber 28, through opening 46 into the bore 44, and then into the bore 50 where it is superheated and then to 54. The steam passes from the bore 54, downwardly, to the openings 56, so that steam may be applied to a garment during the pressing operation.

It will be noted that a sufficient quantity of water may be held in the sadiron, so that the steam will last a considerable length of time.

In Fig. 9 of the drawings, the plug 34 is provided with a through opening 80, having a screw threaded portion 81 closed by a plug 82, formed with a central opening 83. Within the opening 80 is a ball 84 pressed against an internal shoulder 85 by a coil compression spring 86.

If the steam within the chamber 26 rises beyond a predetermined pressure, the steam will forcibly move the ball 84 against the pressure of the spring 86 to permit some steam to escape through the opening 83. This construction provides a safety steam blow off or pressure release valve for the sadiron.

Although the drawings illustrate a circular heating element inserted within the tubular chamber 25, it will be understood that flat heating units or heating units of any other suitable form may be employed.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:

1. A sadiron comprising a one piece metal casing having a bottom wall, and a vertical transverse partition extending upwardly from the bottom wall forming a water chamber at the front of the casing, and a steam chamber at the rear of the casing, said partition being formed with a through opening establishing communication between the steam chamber and the water chamber, said partition being further formed with a vertical passage communicating at its upper end with the steam chamber, said bottom wall being formed with a plurality of apertures extending to the underside thereof, and said bottom wall being further formed with a passage connecting said apertures with the lower end of said vertical passage.

2. A sadiron comprising a one piece metal casing having a bottom wall, and a vertical transverse partition extending upwardly from the bottom wall forming a water chamber at the front of the casing, and a steam chamber at the rear of the casing, said partition being formed with a through opening establishing communication between the steam chamber and the water chamber, said partition being further formed with a vertical passage communicating at its upper end with the steam chamber, said bottom wall being formed with a plurality of apertures extending to the underside thereof, and said bottom wall being further formed with a passage connecting said apertures with the lower end of said vertical passage, and a tube extending through the opening in the partition which connects the steam chamber with the water chamber, said tube having an upwardly extending portion at the forward end.

3. A sadiron comprising a metal casing including a relatively flat sole plate and side walls converging to a point at the front, a heating element above said sole plate and having its sides and front end spaced inwardly from the side edges and front end of said sole plate, said casing including a front end wall, side walls and a top wall for said heating element, said side walls for said heating element being spaced inwardly from the side walls of said casing, water and steam chambers above and at the sides and front of said heating element walls, a transversely arranged partition dividing the forward portion of said casing above and forward of said heating element walls from the rear portion of said casing above said heating element walls, said forward portion constituting said water chamber and said rear portion constituting said steam chamber, said sole plate having a manifold space ahead of said heating element front end wall and a plurality of steam emitting perforations communicating therewith for discharging steam from said perforations to the under surface of said sole plate, and means of communication between said manifold space and the upper part of said steam chamber.

4. A sadiron comprising a metallic casing including a relatively thin sole plate portion and side walls converging to a point at the front end of said sole plate, a heating element on said sole plate portion, said casing including a front end wall, side walls and a top wall for said heating element, said side walls for said heating element being spaced inwardly from said side walls of said casing and said heating element top wall being spaced downwardly from the top wall of said casing, and a substantially vertical transversely arranged partition dividing the forward portion of said casing above said heating element walls from the rear portion of said casing above said heating element walls, said forward portion constituting a water chamber and said rear portion constituting a steam chamber, said sole plate having a manifold space and a plurality of steam emitting perforations communicating therewith for discharging steam therefrom to the under surface of said sole plate, means of communication between said manifold space and the upper part of said steam chamber, and a steam delivery pipe longitudinally and horizontally arranged in said casing, having its rear end passing through said partition and its forward end curved upwardly and terminating adjacent the forward top portion of said water chamber.

5. A sadiron comprising a metal casing including a sole plate, a heating element above said sole plate, said casing including walls surrounding said heating element, water and steam chambers above said walls, said casing including a transverse partition dividing the forward portion of said casing from the rear portion thereof above said walls, said forward portion thereof constituting said water chamber and said rear portion thereof constituting said steam chamber, said sole plate having a manifold space and a plurality of steam emitting perforations communicating therewith for discharging steam from the under surface of said sole plate, means of communication between said manifold space and said steam chamber, a steam delivery pipe having its rear end passing through said partition and its forward end terminating adjacent the forward top portion of said water chamber, and a plug in the rear wall of said casing to gain access to said steam delivery pipe at the point where it extends through said partition.

6. A sadiron comprising a casing including a sole plate, side walls, a top wall and a rear wall, said side walls converging to substantially a point at the front end of said sole plate, a heating element embedded in said casing above said sole plate, said casing having side, top and front walls for enclosing said heating element, said side, top and front walls for said heating element being spaced respectively inwardly from said first mentioned side walls, downwardly from said first mentioned top wall and rearwardly from the front end of said sole plate, water and steam chambers in said casing above said heating element walls, said casing including a transversely arranged partition dividing the forward portion of said casing above said heating element from the rear portion of said casing above said heating element, said forward portion constituting said water chamber and said rear portion constituting said steam chamber, said sole plate having a manifold space ahead of and adjacent said front wall for said heating element, and a plurality of steam emitting perforations communicating with said manifold space for discharging steam therefrom to the under surface of said sole plate, means of communication between said manifold space and the upper part of said steam chamber, and means of communication between the upper forward part of said water chamber and said steam chamber.

BERNARD ALTMAN.
PAUL STILLER.